US007009313B1

(12) United States Patent
Parramon et al.

(10) Patent No.: US 7,009,313 B1
(45) Date of Patent: Mar. 7, 2006

(54) MULTI-COMPLIANCE VOLTAGE GENERATOR IN A MULTICHANNEL CURRENT STIMULATOR

(75) Inventors: Jordi Parramon, Valencia, CA (US); Yuping He, Northridge, CA (US)

(73) Assignee: Advanced Bionics Corporation, Valencia, CA (US)

( * ) Notice: Subject to any disclaimer, the term of this patent is extended or adjusted under 35 U.S.C. 154(b) by 590 days.

(21) Appl. No.: 10/082,613

(22) Filed: Feb. 25, 2002

Related U.S. Application Data

(60) Provisional application No. 60/276,823, filed on Mar. 16, 2001.

(51) Int. Cl.
*H02J 1/00* (2006.01)

(52) U.S. Cl. ........................................................ 307/85

(58) Field of Classification Search .................. 307/64, 307/66, 82, 85, 106, 87; 607/1, 137, 46, 607/7

See application file for complete search history.

(56) References Cited

U.S. PATENT DOCUMENTS

| | | | | |
|---|---|---|---|---|
| 3,646,940 | A | 3/1972 | Timm et al. | 607/40 |
| 3,724,467 | A | 4/1973 | Avery et al. | 607/117 |
| 4,102,347 | A | 7/1978 | Yukl | 607/46 |
| 4,926,864 | A | 5/1990 | Dufresne et al. | 607/72 |
| 5,514,165 | A | 5/1996 | Malaugh et al. | 607/46 |
| 5,643,330 | A | 7/1997 | Holsheimer et al. | 607/46 |
| 5,658,319 | A | 8/1997 | Kroll | 607/7 |
| 5,859,527 | A | 1/1999 | Cook | 323/298 |
| 5,959,371 | A | 9/1999 | Dooley et al. | 307/130 |
| 6,076,018 | A | 6/2000 | Sturman et al. | 607/72 |
| 6,121,761 | A * | 9/2000 | Herbert | 323/282 |
| 6,355,990 | B1 * | 3/2002 | Mitchell | 307/64 |
| 6,516,227 | B1 * | 2/2003 | Meadows et al. | 607/46 |
| 6,754,537 | B1 * | 6/2004 | Harrison et al. | 607/57 |
| 2002/0109415 | A1 * | 8/2002 | McIntyre et al. | 307/109 |
| 2002/0161403 | A1 * | 10/2002 | Meadows et al. | 607/1 |

* cited by examiner

*Primary Examiner*—Robert L. Deberadinis
(74) *Attorney, Agent, or Firm*—Kenneth L. Green; Laura Haburay Bishop

(57) ABSTRACT

An improved multi-voltage power supply charges individual small capacitors to different voltages. Each small capacitor is assigned to a circuit, and is charged to a voltage level sufficient for the circuit. In one embodiment, an improved switching regulator includes a multiplicity of small capacitors. The small capacitors are assigned to stimulation channels of a stimulation system. Each channel has a unique compliance voltage which the assigned small capacitors are charged to. By charging the small capacitors to the corresponding compliance voltages, versus charging a single large capacitor to the maximum compliance voltage, unnecessary power dissipation is avoided. In another embodiment, a switched capacitor power supply benefits from the present invention in the same manner as the switching regulator power supply. Further, any system requiring a plurality of different voltages may benefit from the present invention.

15 Claims, 7 Drawing Sheets

MULTI-COMPLIANCE VOLTAGE GENERATOR IN A MULTICHANNEL CURRENT STIMULATOR

The present application claims the benefit of U.S. Provisional Application Ser. No. 60/276,823, filed Mar. 16, 2001, which application is incorporated herein by reference.

BACKGROUND OF THE INVENTION

The present invention relates to implantable tissue stimulation systems, and more particularly to the independent generation of compliance voltages provided to each stimulation channel in an implantable multichannel tissue stimulation system such as a Spinal Cord Stimulation (SCS) system. A spinal cord stimulation system treats chronic pain by providing electrical stimulation pulses through the electrodes of an electrode array placed epidurally near a patient's spine. The electrode array is partitioned into channels including a current control circuit and cooperating electrodes. The level of stimulation in each channel is controlled by the current control circuit, and any excess power provided to a simulation channel is dissipated. Therefore, the independent generation of the compliance voltage provided to each stimulation channel results in efficient use of power by all of the stimulation channels.

Spinal cord stimulation is a well accepted clinical method for reducing pain in certain populations of patients. SCS systems typically include an Implantable Pulse Generator (IPG), an electrode array with attached electrode lead, and a lead extension. The IPG generates electrical pulses that are delivered to the dorsal column fibers within the spinal cord through the electrodes. The electrodes are implanted along the dura of the spinal cord. Individual electrode contacts (the "electrodes") are arranged in a desired pattern and spacing in order to create an electrode array. Individual wires, within the electrode lead and lead extension, connect the IPG to each electrode in the array. The electrode lead exits the spinal cord and attaches to one or more lead extensions. The lead extension, in turn, is typically tunneled around the torso of the patient to a subcutaneous pocket where the IPG is implanted.

Spinal cord and other stimulation systems are known in the art. For example, an implantable electronic stimulator is disclosed in U.S. Pat. No. 3,646,940 that provides timed sequenced electrical impulses to a plurality of electrodes. As another example, U.S. Pat. No. 3,724,467 teaches an electrode implant for neuro-stimulation of the spinal cord. A relatively thin and flexible strip of biocompatible material is provided as a carrier on which a plurality of electrodes are formed. The electrodes are connected by a conductor, e.g., a lead body, to an RF receiver, which is also implanted, and which is controlled by an external controller.

The electrodes of an SCS system are grouped and included in stimulation channels. Most commonly, each channel includes two electrodes. The resistance of each channel is measured, and a compliance voltage for each channel is determined based on the measured resistance times the desired stimulation current. The resistances and stimulation currents of the channels may vary widely, and thus the compliance voltages also vary.

Known SCS systems include a single voltage source for all of the stimulation channels, and an independent current control circuit for each channel. The current control circuits are controlled by a stimulation control circuit to provide the correct current level to each channel. The voltage provided to each current control circuit is based on the requirements of the of the channel requiring the highest compliance voltage. In each channel that requires a lower voltage level, the excess power is dissipated within the current control circuit. The power dissipation represents a waste of power and places a burden on the battery powering the implantable device. Such burden on the battery results in a shortening of the battery life, and hastens the surgery required to replace the battery or device.

What is needed is a simple and efficient method of adjusting the compliance voltage provided to each channel, so as to avoid unnecessary power dissipation.

SUMMARY OF THE INVENTION

The present invention addresses the above and other needs by providing a multi-compliance voltage generator for implantable medical devices, and is particularly well suited to a multi-channel stimulation system, e.g., a Spinal Cord Stimulation (SCS) system. In a preferred embodiment, the multi-compliance voltage generator comprises a power source (e.g., a battery), an inductor, a first switch, a diode, a multiplicty of switches, and a multiplicity of small capacitors. The first switch closes to cause current to flow through the inductor. When the first switch opens, the current flowing through the inductor flows through the diode and through the fourth switches into the small capacitors. The fourth switches are controlled so that the small capacitors are charged to voltage levels sufficient to satisfy the compliance voltage of the corresponding stimulation channels. After being charged, the capacitors are electrically connected to the stimulation channels, and the outputs of the small capacitors are provided to current control circuits included for each of the stimulation channels.

In accordance with one aspect of the invention, multiple voltages are provided. In operation, the current from the inductor is routed through the diode along parallel paths to all of the multiplicity of small capacitors. One (or a plurality of small capacitors in parallel when greater current is required) of the multiplicity of small capacitors is electrically connected in series with the current control circuits of selected stimulation channels. The level of charge in each of the multiplicity of small capacitors is controlled to provide the required compliance voltage to the current control circuit of the stimulation channel the capacitor is electrically connected to. Thus, the multi-compliance voltage generator provides a separate compliance voltage for each of a multiplicity of parallel stimulation channels based on the individual compliance voltage requirements of each of the stimulation channels. The individual compliance voltage requirements of each channel, in turn, are dictated by the desired stimulation current and resistance of each channel.

It is a feature of the invention to provide a distributed switching regulator power supply wherein the single capacitor used in known switching regulator power supplies is replaced by a multiplicity of small capacitors. One or more of the multiplicity of small capacitors are assigned to selected stimulation channels. The level of charge in each of the small capacitors is matched to the compliance voltage required by the stimulation channel to which the smaller capacitor is assigned. As a result, the power dissipation in the associated current control circuit is minimized. Efficient use of power in implantable devices is an important feature because many known implantable devices are battery powered. Inefficient use of power results in more frequent recharging of the battery, and thereby reduces battery life.

When the battery no longer is capable of holding a sufficient charge, surgery is required to replace the battery or the entire device.

It is a further feature of the invention to replace the single capacitor used in known switching regulator power supplies with a multiplicity of smaller capacitors, wherein the total capacitance remains approximately the same. In known devices, the single capacitor must have sufficient capacitance (and therefore size) to meet the simultaneous power requirements of several of the multiplicity of stimulation channels. In the distributed switching regulator power supply of the present invention, the sum of the capacitance of all of the multiplicity of smaller capacitors is approximately equal to the capacitance of the single capacitor. Therefore the space required by the multiplicity of smaller capacitors is not substantially greater, and may in some instances be less than, than the space required by the single large capacitor.

It is an additional feature of the invention to reduce the time and energy required to charge the multiplicity of small capacitors compared to the time and energy required to charge a single large capacitor. Known power supplies charge a single capacitor to the voltage level of the highest required compliance voltage. This charging process is much like pumping a compressible gas into a fixed volume, wherein the current is analogous to the amount of gas pumped, and the voltage is analogous to the pressure in the fixed volume. The present invention advantageously replaces a single large volume with a multiplicity of small volumes, which small volumes sum to the large volume. Low effort is required to pump the gas into the small volumes while the pressure in the small volumes is low. Only a subset of the small volumes are filled to the highest pressure, and as a result the time and energy required to achieve the higher pressure is reduced. Similarly, if the capacitance (volume) that must be charged (pumped) to the highest voltage (pressure) is reduced, the charging time and energy required is reduced.

It is another feature of the present invention to apply the present invention to known switched capacitor power supplies. After in-parallel capacitors are charged, they are switched from in-parallel to in-series. The total in-series voltage is equal to the sum of the voltages across the individual capacitors. The in-series capacitors are connected through a diode to a high voltage node, and in known switched capacitor power supplies, used to charge a single large capacitor connected between the high voltage node and ground. An improved switched capacitor power supply, according to the present invention, replaces the single large capacitor with a multiplicity of switches and small capacitors. The switches are controlled to charge each small capacitor to a selected voltage, thus efficiently providing a multiplicity of voltages for use within a system.

BRIEF DESCRIPTION OF THE DRAWINGS

The above and other aspects, features and advantages of the present invention will be more apparent from the following more particular description thereof, presented in conjunction with the following drawings wherein:

FIG. 4-2 continues FIG. 4-1; and

Corresponding reference characters indicate corresponding components throughout the several views of the drawings.

DETAILED DESCRIPTION OF THE INVENTION

Figure 1A:
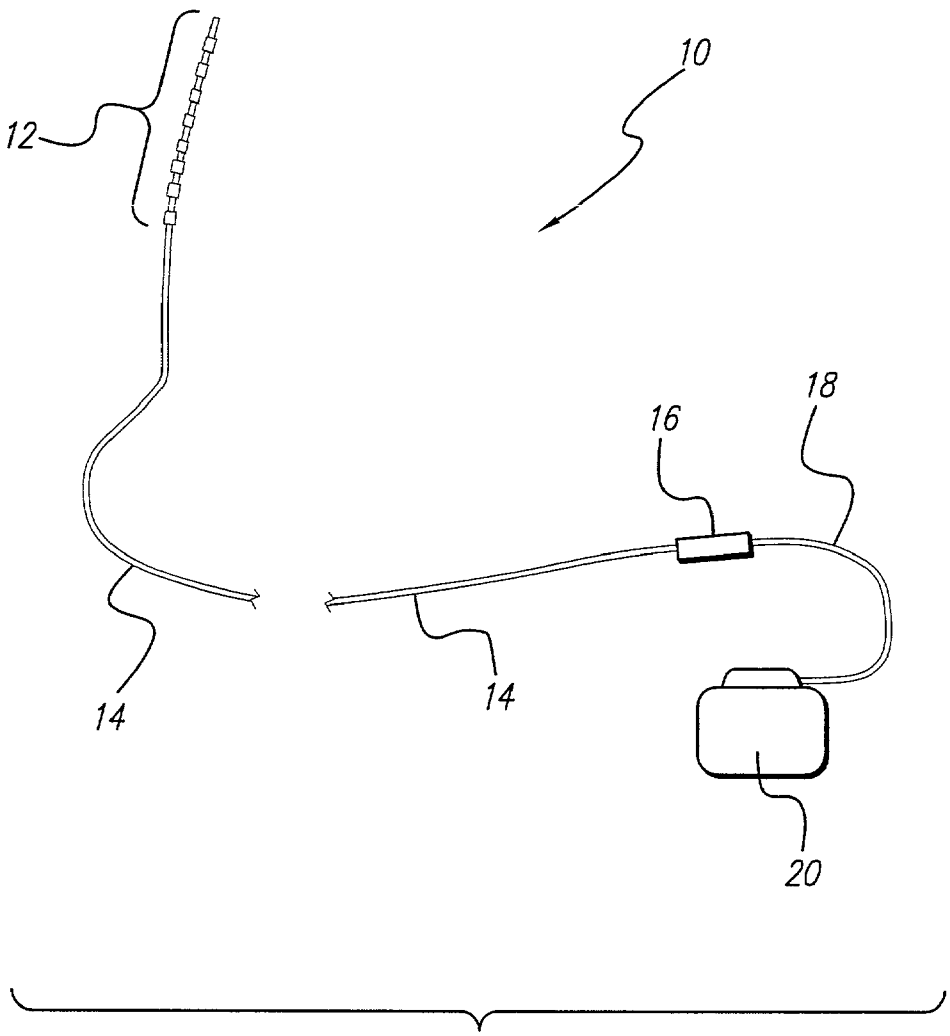
FIG. 1A shows the elements of a typical Spinal Cord Stimulation (SCS) system.

The following description is of the best mode presently contemplated for carrying out the invention. This description is not to be taken in a limiting sense, but is made merely for the purpose of describing the general principles of the invention. The scope of the invention should be determined with reference to the claims.

Implantable medical devices are used for many purposes. The present invention is directed to an implantable electrical stimulator. A preferred electrical stimulator is a Spinal Cord Stimulation (SCS) system 10 shown in FIG. 1A. Typically, an SCS system 10 is used to treat certain classes of intractable pain. The SCS system 10 comprises an electrode array 12, an electrode lead 14, a lead extension connector 16, a lead extension 18, and an Implantable Pulse Generator (IPG) 20.

Figure 1B:
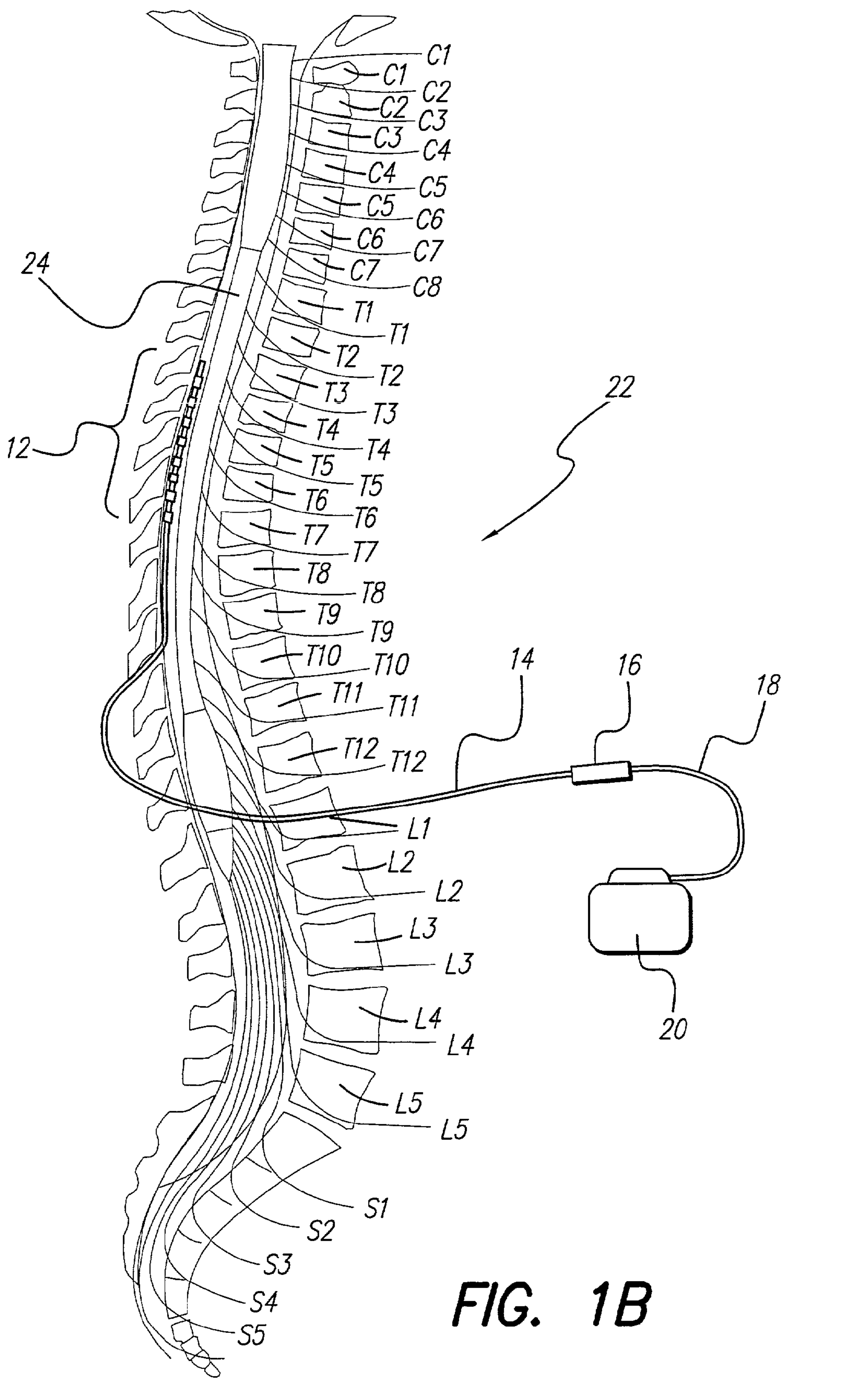
FIG. 1B depicts an SCS system implanted in a patient.

A typical SCS system 10 implanted in a spinal column 22 is shown in FIG. 1B. The electrode array 12 is implanted next to the spinal cord 24 and provides pain-blocking electrical stimulation through groups (typically pairs) of electrodes. The electrode lead 14 is tunneled out of the spinal column, and connects with the lead extension connector 16. There generally is not sufficient space for the IPG 20 at the electrode lead 14 exit point from the spinal column, thus requiring the lead extension 18 to be tunneled to a location in the abdomen, or above the buttocks. The IPG 20 is connected to the end of the lead extension 18.

Figure 2:
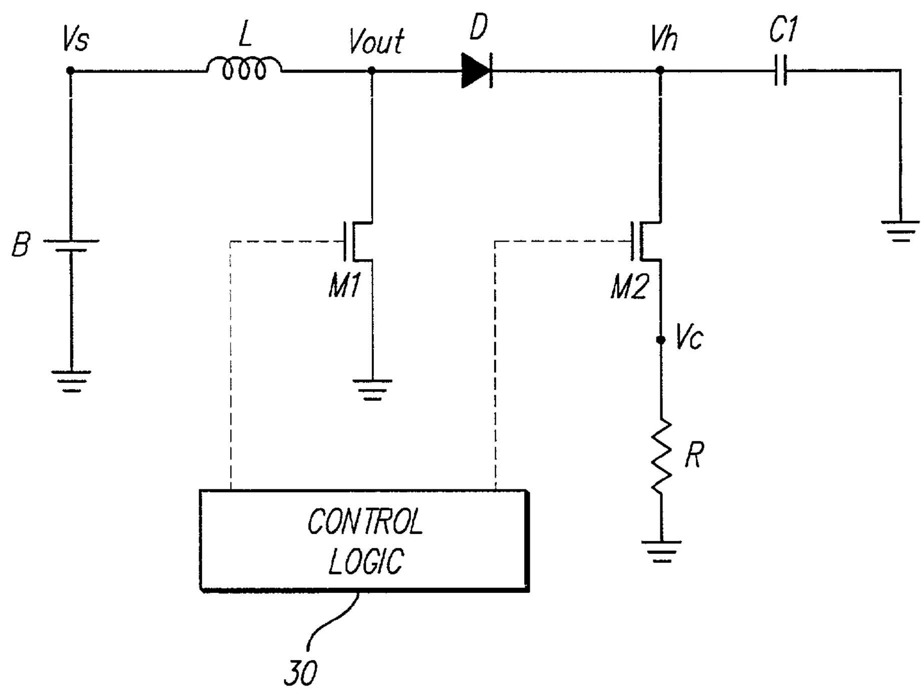
FIG. 2 depicts a typical switching regulator power supply circuit.

Implantable medical devices, such as the SCS system 10 shown in FIG. 1A, typically utilize an implanted power source, typically a battery, as a primary source of operating power. In such devices, there is frequently a need for operating voltages different from the voltage of the primary power source. For example, there is often a need to step up the voltage of the primary power source, to a higher voltage, in order to provide a needed compliance voltage to a stimulation channel to produce a desired stimulation current. Switching regulators, such as shown in FIG. 2, have been used in known Spinal Cord Stimulation (SCS) systems to provide the required compliance voltages. A switching regulator as shown in FIG. 2 comprises a power source (preferably a battery) B, an inductor L, a first switch M1, a diode D, and a capacitor C1. The battery B provides voltage to the input of the inductor L through a source voltage node Vs. The output of the inductor L is connected to a voltage out node Vout. The first switch M1 is connected between the node Vout and ground, which first switch M1 is controlled by control logic 30. The cathode side of the diode D is also connected to node Vout and the capacitor C1 is connected between the anode side of the diode D and ground. A node Vh resides between the diode D and the capacitor C1.

When the switch M1 is closed, a field builds in the inductor L as current begins to flow through the inductor L. When the switch M1 is opened, the inductor L resists a change in current flow, and as a result, forces the current through the diode D, and through the high voltage node Vh.

The only available path for the current flowing through the high voltage node Vh is into the capacitor C1, thereby increasing the charge on the capacitor C1. The resulting voltage level of the capacitor Cl may thereby exceed the voltage level of the battery B.

A load equivalent to a stimulation channel is represented in FIG. 2 by a resistor R. The resistor R is connected to node Vh through a second switch M2. The resistance of resistor R is equivalent to the electrical resistance of a current path between an electrode and ground (or between a pair of electrodes). The level of stimulation in known SCS systems is controlled by controlling the amount of current I flowing through the current path. In order for the stimulation channel to provide the current I, the control logic 30 causes the capacitor Cl to be charged to a compliance voltage Vc sufficient for the current I ($Vc \geqq I*R$). The switch M2 is open while C1 is charged. When the voltage across the capacitor C1 reaches the compliance voltage Vc, the control logic 30 closes the switch M2 to provide the stimulation.

Figure 3:
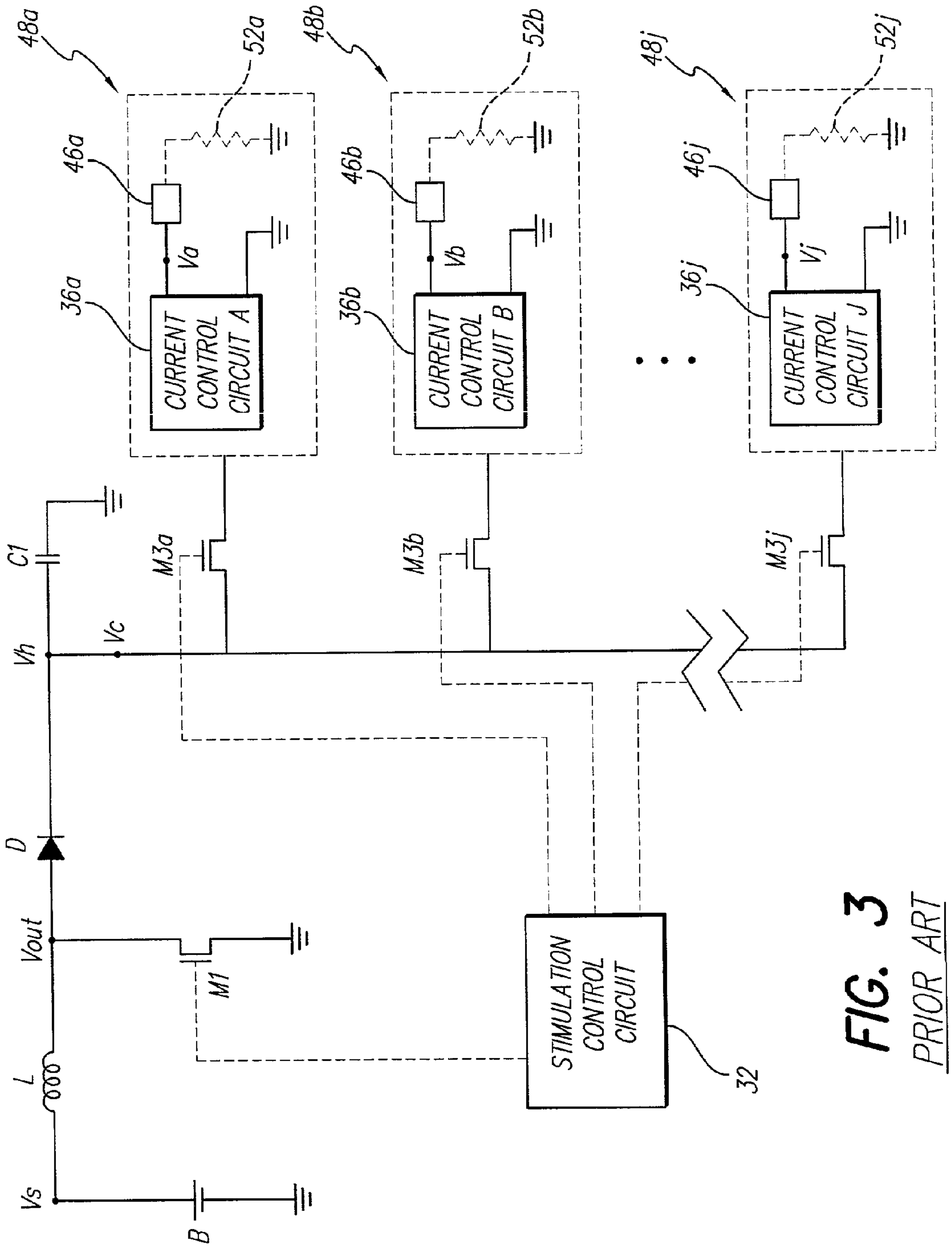
FIG. 3 shows a prior art single capacitor power supply circuit for an SCS system.

Known SCS systems include a multiplicity of stimulation channels to achieve the desired result. In a representative prior art SCS system shown in FIG. 3, a multiplicity of stimulation channels 48*a*–48*j* (the number of stimulation channels in an actual SCS system may vary) are connected to the node Vh through a multiplicity of switches M3*a*–M3*j*. Typically, about four of a multiplicity of stimulation channels 48*a* through 48*j* are selected for stimulation. The capacitor C1 is charged to a compliance voltage Vc required by which ever of the selected stimulation channels 48*a*–48*j* requires the highest compliance voltage. This same high compliance voltage is provided to all of the selected stimulation channels 48*a*–48*j*. While the capacitor C1 is being charged, the switches M3*a*–M3*j* are open. When the capacitor C1 reaches the compliance voltage Vc, the switches M3*a*–M3*j* are closed, and the stimulation current is delivered to the selected stimulation channels. The simulation channels 48*a*–48*j* include current control circuits 36*a*–36*j* which reduce the high voltage compliance voltage Vc at node Vh to the particular compliance voltage Va–Vj of each stimulation channel in order to achieve the desired current flow through the corresponding electrodes 46*a*–46*j*, and representative resistances 52*a*–52*j*.

Figures 1, 4:
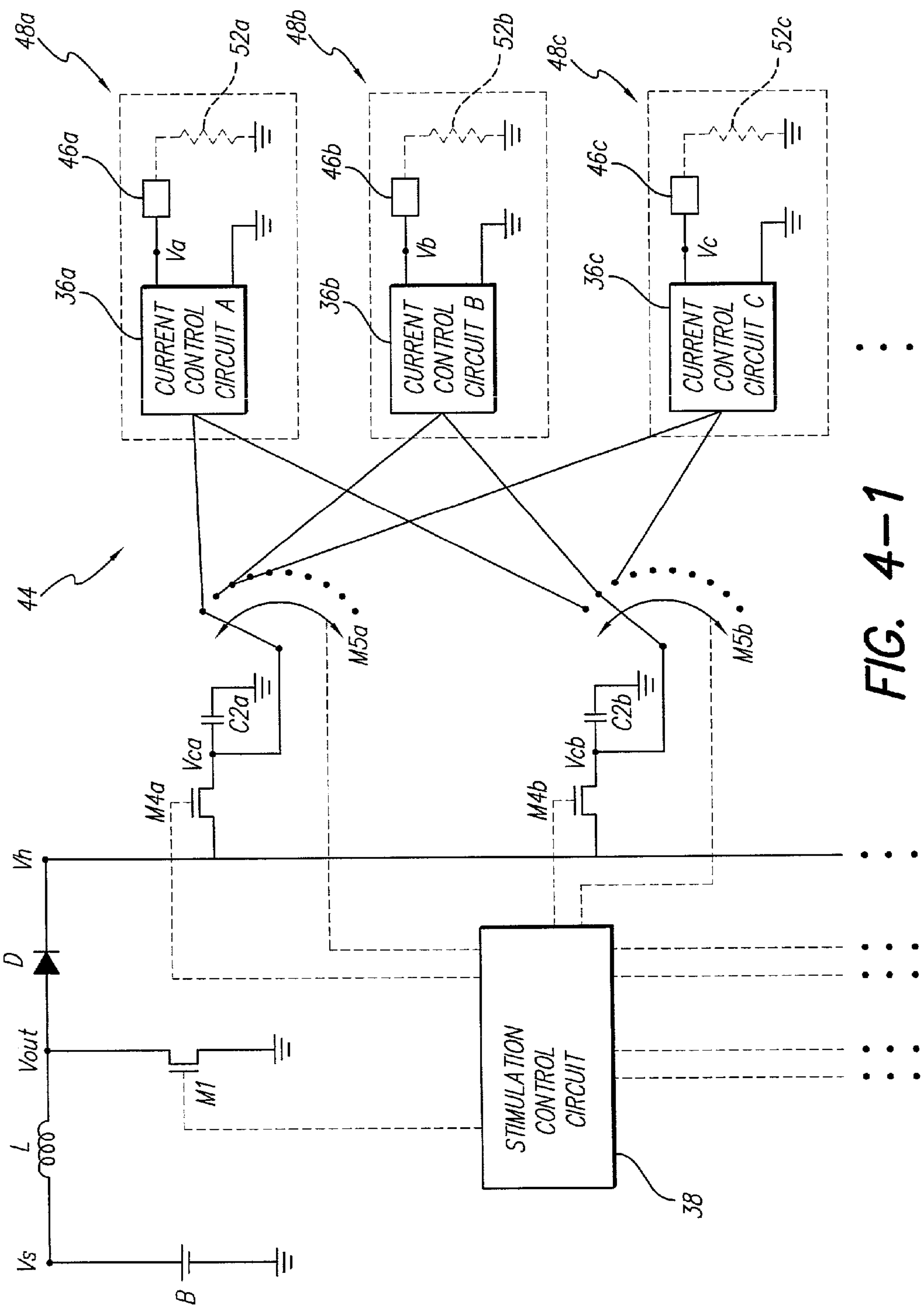
FIG. 4-1 depicts an improved power supply made in accordance with the invention, wherein a multiplicity of small capacitors replace the single large capacitor of FIG. 3.
Figures 2, 4:
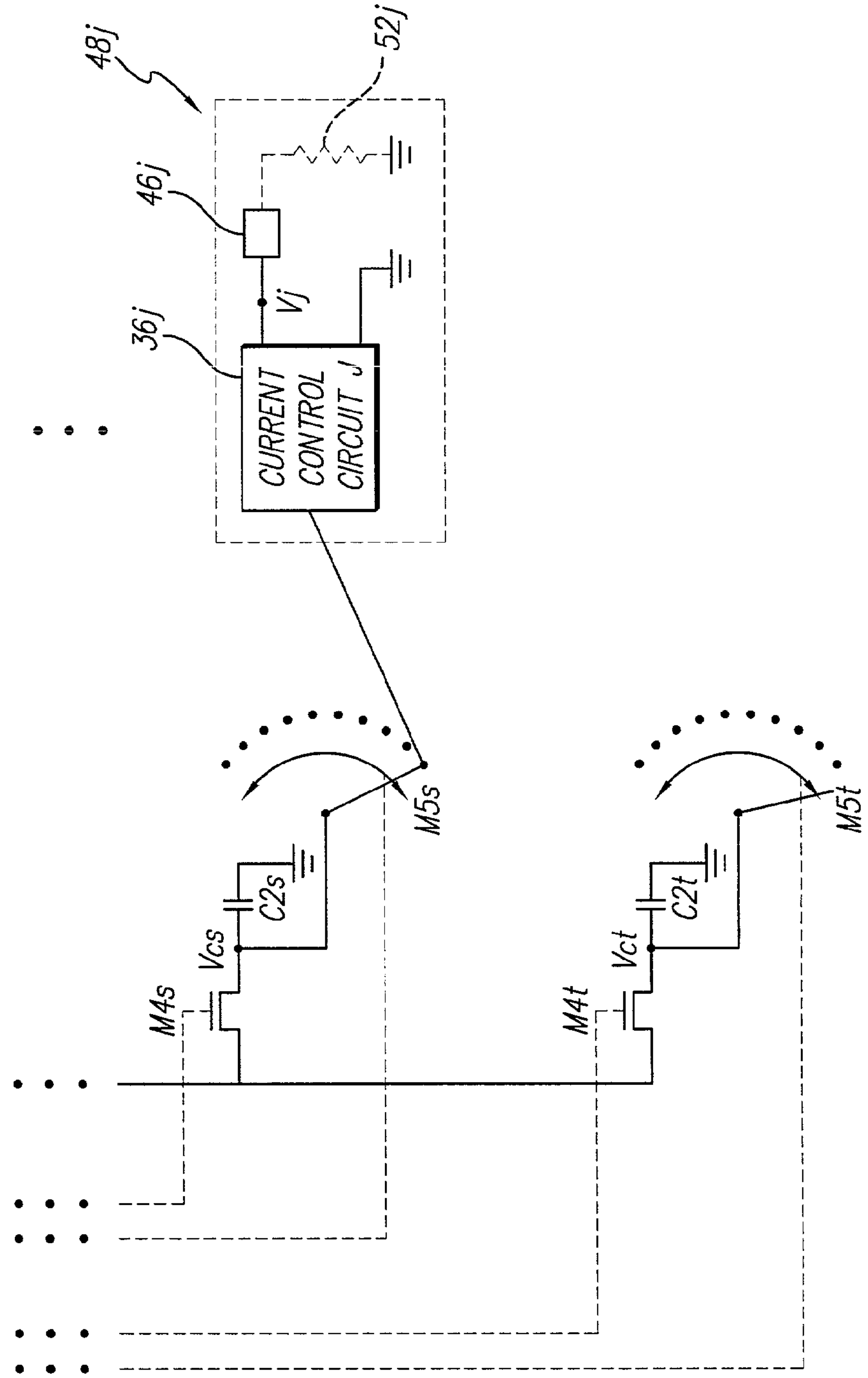

One embodiment of a multi-voltage power supply made in accordance with the present invention is shown in FIGS. 4-1 and 4-2. The multi-voltage power supply has a multiplicity of small capacitors C2*a*–C2*t* that replace the single capacitor C1, used in the prior art power supply of FIG. 3. The capacitor C1 used in the prior art power supply typically has a capacitance of about 20 microfarads. In a preferred embodiment, the multiplicity of small capacitors C2*a*–C2*t* comprise 20 capacitors, each having a capacitance of about 1 microfarad. The front end of the multi-voltage power supply comprises the same power source (preferably a battery) B, inductor L, first switch M1, and diode D as were used in the prior art power supply. The battery B, inductor L, switch M1, and diode D, function as described in FIG. 2, with the same result at the high voltage node Vh. However, the multi-voltage power supply replaces the single large capacitor with the multiplicity of small capacitors C2*a*–C2*t* connected to the node Vh through a multiplicity of switches M4*a*–M4*t*.

The multiplicity of switches M4*a*–M4*t* are controlled by a stimulation control circuit 38 (thereby controlling the charge level for each small capacitor). The stimulation control circuit 38 also controls the switch M1 (thereby regulating the flow of current through the inductor L). A multiplicity of capacitor nodes Vca–Vct individually reside between the multiplicity of switches M4*a*–M4*t* and the multiplicity of small capacitors C2*a*–C2*t*. The multiplicity of switches M4*a*–M4*t*, the multiplicity of capacitor nodes Vca–Vct, and the multiplicity of small capacitors C2*a*–C2*t*, form 20 parallel sub-circuits. Each sub-circuit comprises one of the multiplicity of switches M4*a*–M4*t*, one of the multiplicity of capacitor nodes Vca–Vct, and one of the multiplicity of small capacitors C2*a*–C2*t*, in series.

Continuing with FIGS. 4-1 and 4-2, a multiplicity of switches M5*a*–M5*t* are also individually connected between the multiplicity of capacitor nodes Vca–Vct and a multiplicity of connections 44. The multiplicity of switches M5*a*–M5*t* are adapted to connect the corresponding nodes Vca–Vct to one of the multiplicity of stimulation channels 48*a*–48*j*, or to disconnect the corresponding node Vca–Vct from the stimulation channels 48*a*–48*j*. The majority of the connections 44, between the multiplicity of switches M5*a*–M5*t* and the multiplicity of stimulation channels 48*a*–48*j*, are omitted from FIGS. 4-1 and 4-2 to reduce the complexity of FIGS. 4-1 and 4-2. The multiplicity of switches M5*a*–M5*t* are controlled by the stimulation control circuit 38 (thereby controlling which stimulation channels are provided current). Each small capacitor C2*a*–C2*t* is charged until the voltage at the corresponding node Vca–Vct reaches the compliance voltage Va–Vj of the stimulation channel the small capacitor C2*a*–C2*t* is assigned to.

Typically, each of the multiplicity of small capacitors C2*a*–C2*t* may provide about one milliamp of current for stimulation. Therefore, the number of the multiplicity of small capacitors C2*a*–C2*t* connected to one of the multiplicity of stimulation channels 48*a*–48*j* will correspond to the number of milliamps of current designated for the one of the multiplicity of stimulation channels 48*a*–48*j*. Further, the impedance of each of the multiplicity of stimulation channels 48*a*–48*j* is typically about 1000 ohms, thus the compliance voltage required for each of the multiplicity of stimulation channels 48*a*–48*j* is typically about one volt per milliamp of current. Therefore, the voltage level for each of the multiplicity of small capacitors C2*a*–C2*t* (assuming 1000 ohms resistance) is about equal to or greater then the number milliamps of current that the associated stimulation channel 48*a*–48*j* must provide to its corresponding electrode 46*a*–46*j*.

As an example of the operation of the multi-voltage power supply, consider four stimulation channels, each having a nominal impedance of 1000 ohms, and requiring current levels of 1 ma, 2 ma, 5 ma, and 10 ma. These stimulation channels will require corresponding compliance voltages of 1 volt, 2 volts, 5 volts, and 10 volts. A prior art power supply of the type shown in FIG. 3 requires that a single 20 microfarad capacitor be charged to provide 18 ma at 10 volts. Therefore, the instantaneous power during the stimulation phase is 180 mw. The power supply of the present invention assigns eighteen of the twenty small capacitors to the four stimulation channels. One small capacitor is charged to 1 volt, two small capacitors are charged to 2 volts, five small capacitors are charged to 5 volts, and ten small capacitors are charged to 10 volts. The improved power supply thus reduces the power requirement to 130 mw, providing a savings of 50 mw.

The above example assumes that the power supply includes twenty small capacitors, and that typically, four of a total of ten stimulation channels are exercised simultaneously. Stimulation systems with more or less than twenty small capacitors, more or less than four stimulation channels exercised simultaneously, and more or less than a total of ten stimulation channels are intended to come within the scope of the present invention. Further, while the above description is directed to an improved switching regulator, other power supplies may benefit from the present invention as well, and are intended to come within the scope of the present invention.

Figure 5:
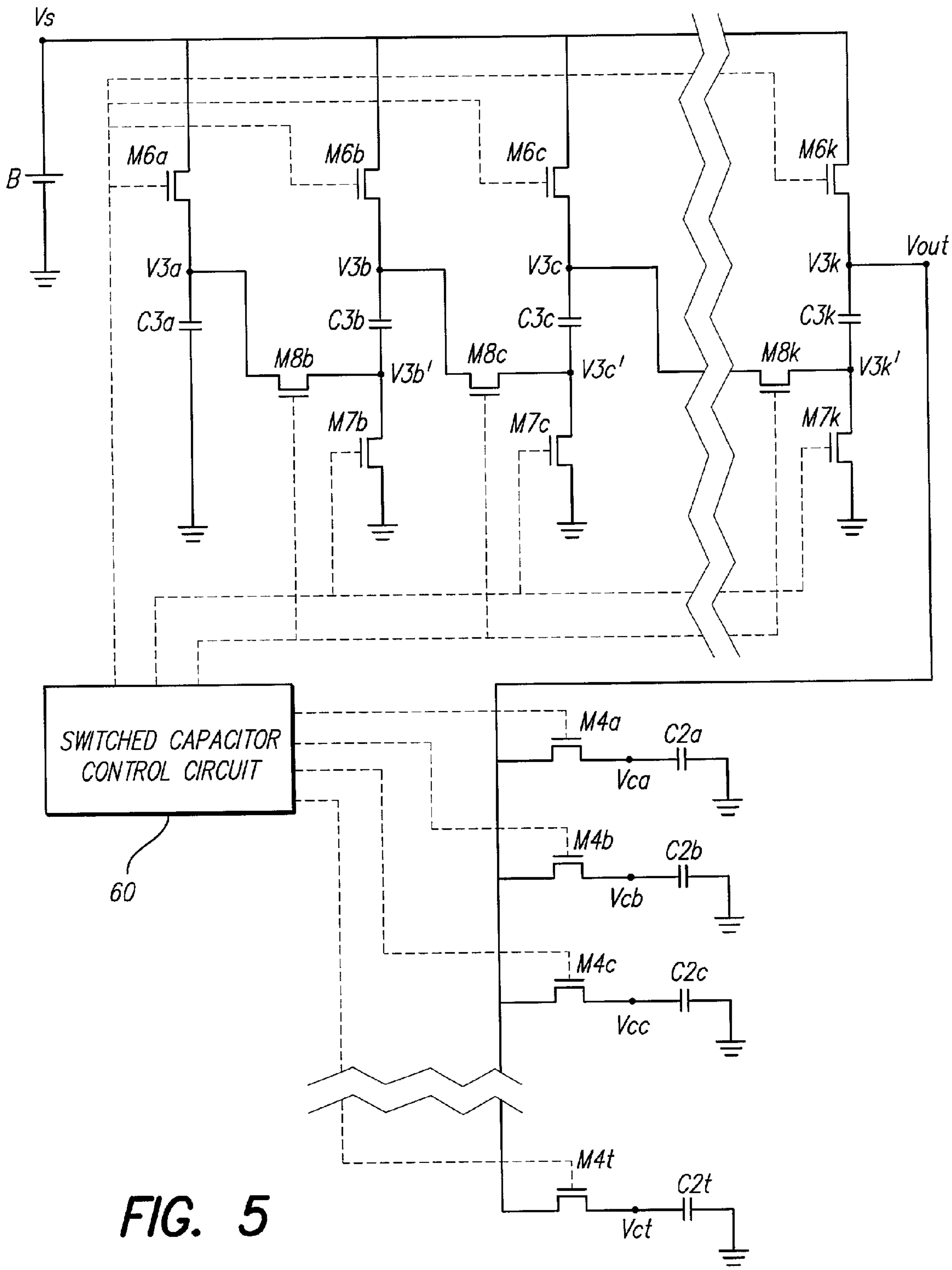
FIG. 5 depicts a multi-voltage switched capacitor power supply made in accordance with the present invention.

A multi-voltage switched capacitor power supply, according to the present invention, is shown in FIG. 5 which benefits by selectively charging the multiplicity of small capacitors C2*a*–C2*t* to various voltages, versus charging a single capacitor to the highest voltage requirement. The multi-voltage switched capacitor power supply includes a multiplicity of switched capacitors C3*a*–C3*k* connectable in parallel between the source voltage node Vs (typically the output of the battery B) and ground. Additionally, a multiplicity of switches M6*a*–M6*k* are electrically connected between the node Vs and the capacitors C3*a*–C3*k*, and a multiplicity of switches M7*b*–M7*k* are electrically connected between capacitors C3*b*–C3*k* and ground. The multi-voltage switched capacitor power supply includes nodes V3*a*–V3*k* between the switches M6*a*–M6*k* and the respective capacitors C3*a*–C3*k*. The multi-voltage switched capacitor power supply further includes nodes V3*b*'–V3*k*' between the capacitors C3*b*–C3*k* and the switches M7*b*–M7*k*. The nodes V3*a*–V3*k* are connected through a multiplicity of switches M8*b*–M8*k* to nodes V3*b*'–V3*k*', with the exception that node V3*k* is connected to Vout.

The multi-voltage switched capacitor power supply operates by closing the switches M6*a*–M6*k* and the switches M7*b*–M7*k* and opening the switches M8*b*–M8*k*, resulting in charging the capacitors C3*a*–C3*k* in parallel. The switches M6*a*–M6*k* and the switches M7*b*–M7*k* are then opened and the switches M8*b*–M8*k* are closed, placing the capacitors C3*a*–C3*k* in series and resulting in the sum of the voltages of the capacitors C3*a*–C3*k* on the node Vout. The switches M6*a*–M6*k*, M7*b*–M7*k*, and M8*b*–M8*k* are controlled by switched capacitor control circuit 60.

The small capacitors C2*a*–C2*t* are connected to the node Vout through the respective switches M4*a*–M4*t*. The switches M4*a*–M4*t* are controlled by the switched capacitor control circuit 60 such that each of the small capacitors C2*a*–C2*t* are charged a determined voltage. In systems including circuits requiring several different voltages (e.g., a stimulation system with stimulation channels having several different compliance voltages), the ability to selectively charge the small capacitors to the different voltages results in energy savings. Additionally, the multiplicity of switches M5*a*–M5*t* described in FIGS. 4-1 and 4-2 may be similarly utilized with the multi-voltage switched capacitor power supply, and the multi-voltage switched capacitor power supply may similarly be used to provide the compliance voltages to the stimulation channels of an SCS or similar system.

Thus, both a switching regulator power supply, and a switched capacitor power supply have been described above which efficiently provide power to a multiplicity of stimulation channels having different compliance voltages. Further, any system requiring a multiplicity of different voltages may benefit from the present invention, for example, an Implantable Cochlear Stimulation (ICS) system or a Deep Brain Stimulation (DBS) system. Moreover, any power supply using any method to generate a high voltage greater than a power source, to charge an intermediate energy storage device, may benefit from the present invention.

While the invention herein disclosed has been described by means of specific embodiments and applications thereof, numerous modifications and variations could be made thereto by those skilled in the art without departing from the scope of the invention set forth in the claims.

The invention claimed is:

1. A power supply comprising:

a power source providing a source voltage;

means for processing the source voltage to generate an output voltage at a Vout node, wherein the output voltage varies from the source voltage;

a multiplicity of energy storage devices adapted to individually controllably receive energy from the Vout node;

a multiplicity of Vc nodes wherein the multiplicity of energy storage devices are electrically connected between the Vc nodes and ground; and a multiplicity of switches (M5*a*–M5*t*), each electrically connected between a Vc node and one or more stimulation channels, wherein the switches (M5*a*–M5*t*) are adapted to selectably connect the Vc nodes to the one or more stimulation channels;

wherein the means for processing comprises a switched capacitor circuit comprising a multiplicity of switched capacitors, wherein the multiplicity of switched capacitors are disconnectably connectable in-parallel, wherein the in-parallel multiplicity of switched capacitors are chargeable from the power source, and the multiplicity of switched capacitors are disconnectably connectable in-series.

2. The power supply of claim 1 wherein the energy storage devices comprise a multiplicity of small capacitors.

3. The power supply of claim 2 wherein the multiplicity of energy storage devices includes a multiplicity of switches (M4*a*–M4*t*) individually in series with the multiplicity of small capacitors, wherein each of the multiplicity of switches (M4*a*–M4*t*) and a respective small capacitor are electrically connected between the Vout node and ground, and wherein the multiplicity of switches (M4*a*–M4*t*) are controlled to independently regulate the degree to which each of the multiplicity of small capacitors is charged.

4. The power supply of claim 2 further including a multiplicity of switches (M4*a*–M4*t*) individually in series with the multiplicity of small capacitors, wherein each of the multiplicity of switches (M4*a*–M4*t*) and a respective small capacitor are electrically connected between the Vout node and ground, and wherein the multiplicity of switches (M4*a*–M4*t*) are controlled to independently determine the voltage to which each of the multiplicity of small capacitors is charged.

5. The power supply of claim 1 further including a diode and a Vh node, wherein the diode is electrically connected between the Vout node and the Vh node, wherein the cathode terminal of the diode is electrically connected to the Vout node, and wherein the anode terminal of the diode is electrically connected to the Vh node, and where in the Vh node is electrically connected between the diode and the energy storage devices.

6. The power supply of claim 1 wherein the power source comprises a battery.

7. The power supply of claim 1 wherein the means for processing comprises a switching regulator comprising:

an inductor; and a first switch;

wherein the inductor is electrically connected between the source voltage and the Vout node, and wherein the first switch is electrically connected between the Vout node and ground.

8. The power supply of claim 7 wherein the energy storage devices comprise a multiplicity of small capacitors.

9. The power supply of claim 8 further including:

a diode electrically connected between the Vout node and the Vh node; and a multiplicity of switches (M4*a*–M4*t*) individually in series with the multiplicity of small capacitors, wherein each of the multiplicity of switches (M4*a*–M4*t*) and a respective small capacitor are electrically connected between the Vh node and ground, and wherein the multiplicity of switches (M4*a*–M4*t*) are controlled to independently determine the voltage to which each of the multiplicity of small capacitors is charged.

10. An improved power supply for implantable devices, the power supply comprising:

a battery;

a control circuit;

a multiplicity of switched capacitors adapted to be electrically configurable in parallel between the battery and ground and electrically configurable in series between ground and a node Vout, wherein the configuration of the switched capacitors is controlled by the control circuit;

a multiplicity of small capacitors in parallel;

a multiplicity of switches (M4*a*–M4*t*) in parallel, each electrically connected individually between the node Vout and one of the small capacitors, wherein the switches (M4*a*–M4*t*) are controlled by the control circuit;

a multiplicity of Vc nodes wherein the small capacitors are electrically connected between the Vc nodes and ground; and a multiplicity of switches (M5*a*–M5*t*), each electrically connected between a Vc node and one or more stimulation channels, wherein the switches (M5*a*–M5*t*) are adapted to selectably connect the Vc nodes to the one or more stimulation channels.

11. A method for providing multi-voltage power, comprising:

providing a source voltage to a node Vs;

disconnectably connecting a multiplicity of switched capacitors in parallel between the node Vs and ground;

disconnectably connecting the switched capacitors in series between ground and a node Vout; and connecting a multiplicity of parallel sub-circuits between the node Vout and ground, wherein each parallel sub-circuit comprises a switch, a node Vc, and a small capacitor, wherein the small capacitor is electrically connected between the switch and ground, and the node Vc is between the switch and the capacitor.

12. The method of claim 11 further including:

selecting a group of the stimulation channels for stimulation;

assigning at least one of the parallel sub-circuits to each of the selected stimulation channels;

controlling the switch within each parallel sub-circuit, to match the voltage of node Vc to the compliance voltage of the stimulation channel that the parallel sub-circuit is assigned to; and electrically connecting the node Vc within each parallel circuit to the stimulation channel to which the parallel circuit is assigned, thereby providing stimulation.

13. The method of claim 12 wherein selecting a group of the stimulation channels comprises selecting a group of the stimulation channels of a Spinal Cord Stimulation (SCS) system for stimulation.

14. The method of claim 12 wherein selecting a group of the stimulation channels comprises selecting a group of the stimulation channels of an Implantable Cochlear Stimulation (ICS) system for stimulation.

15. The method of claim 12 wherein selecting a group of the stimulation channels comprises selecting a group of the stimulation channels of a Deep Brain Stimulation (DBS) system for stimulation.

* * * * *